US009969623B2

(12) United States Patent
Fronabarger et al.

(10) Patent No.: US 9,969,623 B2
(45) Date of Patent: May 15, 2018

(54) METHOD FOR PREPARATION OF SILVER AZIDE

(71) Applicant: Pacific Scientific Energetic Materials Company, Chandler, AZ (US)

(72) Inventors: John W. Fronabarger, Sun Lakes, AZ (US); Jon G. Bragg, Phoenix, AZ (US); Michael D. Williams, Gilbert, AZ (US)

(73) Assignee: Pacific Scientific Energetic Materials Company, Chandler, AZ (US)

( * ) Notice: Subject to any disclaimer, the term of this patent is extended or adjusted under 35 U.S.C. 154(b) by 246 days.

(21) Appl. No.: 14/710,054

(22) Filed: May 12, 2015

(65) Prior Publication Data
US 2015/0321922 A1    Nov. 12, 2015

Related U.S. Application Data

(60) Provisional application No. 61/991,999, filed on May 12, 2014.

(51) Int. Cl.
*C01G 5/00* (2006.01)
*C01B 21/08* (2006.01)

(52) U.S. Cl.
CPC ............... *C01G 5/00* (2013.01); *C01B 21/08* (2013.01)

(58) Field of Classification Search
None
See application file for complete search history.

(56) References Cited

U.S. PATENT DOCUMENTS 3,943,235 A    3/1976  Costain

FOREIGN PATENT DOCUMENTS

GB    781440    8/1957
GB    887141    1/1962
RU    2130423 C1    5/1999

OTHER PUBLICATIONS

"Energetic Materials", Edited by H.D. Fair, R.F. Walker, New York, Plenum Press, vol. 2 (1977), p. 11.
G.W.C. Taylor, "The Manufacture of Silver Azide RD1336" Report 2/R/50 (Accession No. ADA 474242), Explosives Research and Development Establishment, Waltham Abbey, 1950.
R. McGuchan, "Improvements in Primary Explosive Compositions and their Manufacture", Proceedings of the 10th Symposium on Explosives and Pyrotechnics, San Francisco, CA (USA), 1979.
M. van der Merwe, "The Preparation and Chemical and Physical Characterization of Silver Azide," Proceedings of the 12th Symposium on Explosives and Pyrotechnics, San Diego, CA (USA), 1984.
International Patent Application No. PCT/US2015/030344, Search Report and Written Opinion dated Sep. 29, 2015.
International Preliminary Report on Patentability, PCT Patent Application No. PCT/US2015/030544, dated Nov. 24, 2016, 9 pages.

*Primary Examiner* — Guinever S Gregorio
(74) *Attorney, Agent, or Firm* — Kilpatrick Townsend & Stockton LLP

(57) ABSTRACT

Described are methods of preparing silver azide comprising reacting a silver salt, an azide salt, ammonium hydroxide, and a hydrolysable ester at an elevated temperature.

35 Claims, 1 Drawing Sheet

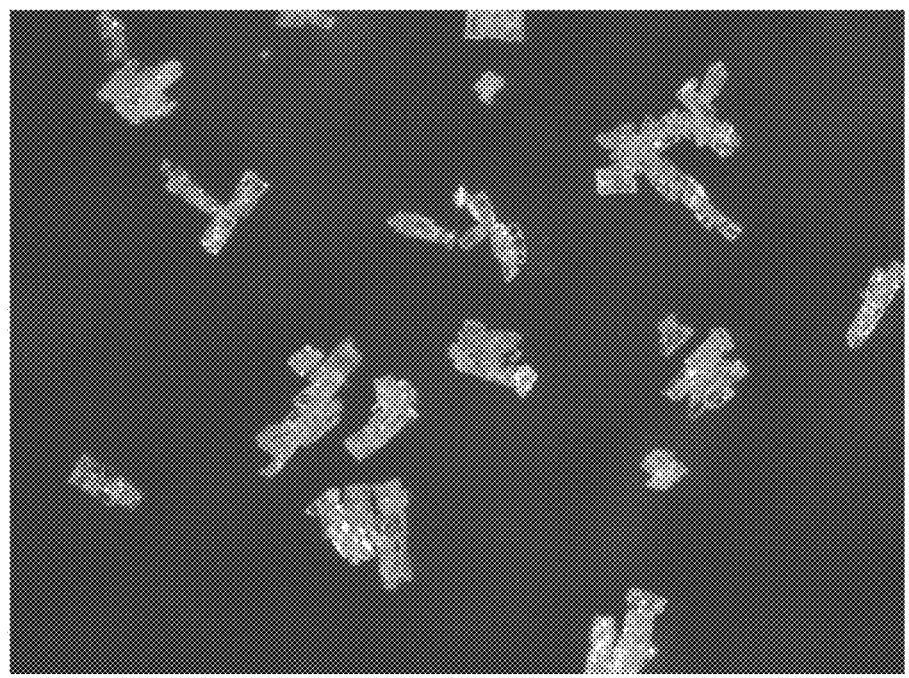

METHOD FOR PREPARATION OF SILVER AZIDE

CROSS REFERENCE TO RELATED APPLICATIONS

This application is related to and claims priority benefits from U.S. Provisional Application Ser. No. 61/991,999 ("the '999 application"), filed on May 2, 2014, entitled METHOD FOR PREPARATION OF SILVER AZIDE. The '999 application is hereby incorporated in its entirety by this reference.

FIELD OF THE INVENTION

This invention relates to explosives, and in particular to a method for preparation of the primary explosive silver azide.

BACKGROUND OF THE INVENTION

Lead azide ("LA") has been widely used in ordnance systems for many years. Virtually all chemical detonators utilize LA as the initial shock wave generating compound necessary for proper detonation of subsequent main explosive charges. LA is a reliable explosive material and because it has been studied extensively, properties and manufacturing processes are well defined. Despite being a useful energetic material. LA contains lead, a toxic heavy metal that is released to the environment during production and use. LA also has shortcomings in that it is unstable in non-hermetic munitions applications and decomposes to hydrazoic acid gas in the presence of water and $CO_2$. This hydrazoic acid may react with metal components elsewhere in the munition to form unstable metal azides such as copper azide.

Various other inorganic aides have been considered for use as detonants. Of these, only silver azide (SA) has properties that make it suitable for general usage. In addition, silver azide has a number of advantages over LA that make it appealing for use in commercial detonators. Silver generated from use of silver azide is generally considered less toxic from both environmental and human health perspectives relative to lead. Silver azide also generates a very low partial pressure of hydrazoic acid when exposed to water and $CO_2$, precluding formation of other metal azides that may he considered hazardous. Most importantly, silver azide demonstrates superior chemical stability and has enhanced detonation properties compared to lead azide.

A number of methods have been utilized to prepare silver azide, the majority involve reaction of sodium azide with a water soluble silver salt such as silver nitrate. "Energetic Materials", Edited by H. D. Fair, R. F. Walker, New York, Plenum Press, Vol. 2 (1977), p. 11.

The low solubility of silver azide and propensity for profuse nucleation leads to a colloidal product with low bulk density and poor handling characteristics when silver azide is prepared by this unmodified process. Synthesis of silver azide utilizing sodium hydroxide and, later, ammonium hydroxide, increased the solubility of the silver azide formed and provided a larger, crystalline product via slow addition of acid (RD1336). GB Patent 887,141; GB Patent 781,440; G. W. C. Taylor, "The Manufacture of Silver Azide RD1336" Report 2/R/50 (Accession No. ADA 474242), Explosives Research and Development Establishment, Waltham Abbey, 1950.

Current methods of silver azide production typically use a "Costain" process, which provides a product with reasonably consistent particle size and morphology, good handling characteristics, and a high bulk density. U.S. Pat. No. 3,943,235. The Costain process involves addition of an aqueous sodium azide solution to a solution of silver nitrate and ammonium hydroxide in water. The ammonium ion coordinates with the silver to provide a soluble silver complex. The mixture is heated to 75° C., and the ammonia is slowly distilled off, breaking down the complex and thereby supplying silver at a slow, controlled rate. At the first appearance of precipitation of silver azide, a dilute solution of acetic acid is introduced to neutralize free ammonia and induce formation of seed crystals. The temperature is then ramped to 90-95° C. to remove additional ammonia, and the reaction volume is maintained by addition of water. During the distillation of ammonia, additional silver azide crystals form. The reaction is terminated by cooling, and residual ammonia is neutralized with dilute acetic acid. The product is isolated by filtration to afford a free-flowing granular silver azide product. Typically, particle size and morphology of the product may be controlled to some extent by altering reaction concentration, stirring rate, and/or reactor configuration.

Further modifications of the initial Costain process have been made to control the nucleation process and thus the properties of the silver azide produced. These include use of acids other than acetic acid or addition of modifiers such as sodium carboxymethylcellulose to better control nucleation rate or crystal habit. R. McGuchan, "Improvements in Primary Explosive Compositions and their Manufacture", Proceedings of the $10^{th}$ Symposium on Explosives and Pyrotechnics, San Francisco, Calif. (USA), 1979; M. van der Merwe, "The Preparation and Chemical and Physical Characterization of Silver Azide," Proceedings of the 12th Symposium on Explosives and Pyrotechnics, San Diego, Calif. (USA), 1984.

The Costain and modifications of the Costain method for preparation of silver azide do not appear to be optimal for preparation of a highly consistent silver azide product that exhibits high thermal stability for use in commercial applications. High purity silver azide that is chemically stable to 500° F. may be produced on a small scale utilizing the Costain process; however, scale-up to the ≥100 gram level seems problematic. These issues appear to be related to inconsistent morphology that is often a result of the process including accelerated crystallization at the reaction-air interface and volume and associated temperature) changes during the distillation of ammonia. Plating of silver azide on reactor walls and stirring apparatus also typically occur. The consequence may be a lower purity product with attenuated thermal stability. Addition of a crystal modifier may provide reproducible morphology but may lower the thermal stability as well.

As a result, there is a need to improve the reproducibility of the silver azide manufacturing process. Historically, modifications of the silver azide process have sought to reduce rapid nucleation pH adjustment prior to and/or during crystallization and increasing particle size, bulk density, and providing consistent morphology by decreasing the rate of ammonia evolution. A new method has been developed which controls these properties of the silver azide product not by ammonia evolution (decoction of the silver-ammonium complex) but via hydrolysis of an appropriate ester to form ammonium acetate. This new procedure utilizes ethylene glycol diacetate or other related esters to neutralize the ammonium ion. The reaction is initially biphasic with reactants in an aqueous phase that is in contact with an organic phase containing the ester. The reaction is heated (50° C.-90° C.) with stirring and as the ammonia is neutralized, the reaction becomes monophasic (since the hydrolysis product, ethylene glycol monoacetate is water soluble) and silver azide is formed. Evolution of ammonia gas is minimized during the process to afford more kinetic control of the crystallization and avoid issues related to the Costain process.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method of preparing silver azide comprises reacting a solution of a silver salt, an azide salt, ammonium hydroxide, and a hydrolysable ester at an elevated temperature. In certain additional embodiments, a method of preparing silver azide comprises mixing a silver salt and ammonium hydroxide in water, adding an aqueous solution of an azide salt, adding a hydrolysable ester, and heating the mixture.

The silver salt may comprise at least one of silver nitrate and silver acetate. The azide salt may comprise at least one of sodium azide and potassium azide. The hydrolysable ester may comprise at least one of ethylene glycol diacetate and glycerol monoacetate.

The azide salt may be supplied in a molar ratio range of about 1 mole to about 1.2 moles per mole of silver salt. The ammonium hydroxide may be supplied in a molar ratio range of about 3 moles to about 6 moles per mole of silver salt. The hydrolysable ester may be supplied in a molar ratio range of about 10 moles to about 15 moles per mole of silver salt.

In some embodiments, the elevated temperature is greater than 50° C. In other embodiments, the elevated temperature is in a range of about 50° C. to about 90° C. in yet other embodiments, the elevated temperature is about 65° C.

In some embodiments, the method may further comprise producing a yield of at least 95% silver azide.

In certain, embodiments, the method may further comprise adding a solvent to form the solution of the silver nitrate, the ammonium hydroxide, and the azide salt. The solvent may comprise water.

According to certain embodiments of the present invention, a reaction product of a silver salt, ammonium hydroxide, an azide salt, a suitable ester, and water.

According to additional embodiments of the present invention, a method of preparing silver azide comprises providing an aqueous solution of a silver salt and ammonium hydroxide (Solution A), providing an aqueous solution of an azide salt (solution B), adding solution B to solution A, adding a suitable ester, and heating the mixture to a temperature greater than 50° C.

According to further embodiments of the present invention, a method of preparing silver azide comprises providing an aqueous solution of silver nitrate and ammonium hydroxide (Solution A), providing an aqueous solution of sodium azide (solution B), adding solution B to solution A, adding ethylene glycol diacetate, and heating the mixture to a temperature of about 75° C.

BRIEF DESCRIPTION OF THE DRAWINGS

The invention will be better understood on reading the following description and examining the FIGURES that accompany it. These FIGURES are provided by way of illustration only and are in no way limiting on the invention.

FIG. 1 is a photomicrograph of silver azide at 48× magnification, according to certain embodiments of the present invention.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Methods of preparing, silver azide are contemplated in the present application. Silver azide may be prepared by reacting a silver salt, an azide salt, ammonium hydroxide, and a hydrolysable ester at an elevated temperature.

It will be understood that silver azide may be prepared by reacting any suitable silver salt with appropriate water solubility. Any suitable silver salt may be used, including but not limited to silver nitrate, silver acetate, or any suitable mixture thereof. Any suitable azide salts may be used, including but not limited to sodium azide, potassium azide, or any suitable mixture thereof. Any suitable esters may be used including but not limited to ethylene glycol diacetate, glycerol monoacetate, or any suitable mixture thereof. Any suitable solvents may be used, including but not limited to water.

Regarding quantities of the components employed, an azide salt may be supplied in a molar ratio range of about 1 mole to about 1.2 mole per mole of silver salt. Ammonium hydroxide may be supplied in a molar ratio range of about 3 moles to about 6 moles per mole of silver salt. Ethylene glycol diacetate may be supplied in a molar ratio range of about 10 moles to about 15 moles per mole of silver salt. For example, sodium azide may be supplied in a molar ratio range of about 1.1 moles per mole of silver nitrate, while ammonium hydroxide may be supplied in a molar ratio range of about 5 moles per mole of silver nitrate, and ethylene glycol diacetate may be supplied in a molar ratio range of about 14 moles per mole of silver nitrate.

A solvent may be supplied in an amount that is suitable to effectuate the reaction between the azide salt, the silver salt, ammonium hydroxide, and the hydrolysable ester. As a more specific example, water (or other solvent) may be supplied in an amount that is suitable to effectuate the reaction between the starting materials.

The components may be reacted under conditions suitable to synthesize silver azide. In certain embodiments, the components may be reacted by mixing a silver salt and ammonium hydroxide in water, adding an aqueous solution of an azide salt followed by a hydrolysable ester, and heating the mixture.

In certain embodiments, the mixture may be maintained at an elevated temperature greater than 50° C., more specifically in a range of about 50° C. to about 90° C., and more specifically at about 65° C.

In additional embodiments, the method of preparing silver azide includes providing an aqueous solution of a silver salt and ammonium hydroxide (Solution A), providing an aqueous solution of an azide salt (solution B), adding solution B to solution A, adding a suitable ester, and heating the mixture to a temperature greater than 50° C.

In further embodiments, the method of preparing silver made includes providing an aqueous solution of silver nitrate and ammonium hydroxide (Solution A), providing an aqueous solution of sodium azide (solution B), adding solution B to solution A, adding ethylene glycol diacetate, and heating the mixture to a temperature of about 75° C.

The duration of the heating step may be a duration that is greater than about 1 hour, more specifically greater than about 8 hours, and more specifically about 6 hours. The heating duration may be modified to increase product yield.

The product contemplated and made by the methods of the present application (silver azide) may be found suitable for use as a primary explosive and, in particular, as a component in detonators. Benefits include straightforward and safe preparation with consistent morphology and thermal stability required for high temperature commercial applications.

An advantage of this method is that a high purity silver azide product with high thermal stability may be obtained reproducibly. Morphology of the silver azide product is cubic and is substantially consistent throughout the product and between batches. The product is granular and free flowing. Batch sizes of between 2 and 300 grams of silver azide have been prepared via this process.

A further advantage of this process is that it appears to be inherently safer than a typical Costain procedure. Interaction with the reaction is minimized as reactants may be combined and heated remotely. There is no need for strong heating to remove ammonia and crystallization on the stirrer and reactor sides do not occur. There is no requirement for volume or temperature changes during the process. The silver azide forms via homogeneous precipitation and collects entirely in a granular form at the bottom of the reactor.

An additional benefit of this procedure is the high thermal stability of the product. Silver azide produced by this method may routinely be used in detonator applications where the temperature exceeds 500° F. for ≤24 hours. Applications would include high temperature oil field completion work; however, other commercial tasks are contemplated.

As an example, ammonium hydroxide may be added to an aqueous solution of silver nitrate to afford a colorless solution. An aqueous solution of sodium azide may then be added followed by ethylene glycol diacetate to provide a clear biphasic mixture. The mixture may then be placed in a preheated bath at 75° C. for 6 hours. During the reaction, silver azide is formed. After cooling, the silver azide is collected by filtration and washed with water and 2-propanol.

EXAMPLES

The following examples demonstrate the preparation and characterization of silver azide as taught herein.

Example 1

Silver nitrate (3.02 g, 17.76 mmol) was dissolved in 40 mL of deionized water and placed in a 250 mL round bottom flask with a 27 mm oval magnetic stir bar. Ammonium hydroxide solution (28%, 12 mL, ~95 mmol) was added. A solution of sodium azide (1.2 eq., 1.39 g) in 20 mL of deionized water was added followed by ethylene glycol diacetate (14 eq., 32.2 mL). The mixture was placed in a preheated oil bath (75° C.), fitted with an (ambient temperature) condenser and stirred at 75° C. for 40 minutes as a clear biphasic solution. At 40 minutes, silver azide began to crystallize. The reaction was continued at 75° C. for a total reaction time of 6 hours 13 minutes. The suspension was removed from the bath, cooled to room temperature and filtered over Whatman #1 filter paper. The silver azide product was washed with water and 2-propanol and allowed to air dry. Overall yield was 98% based on silver. The product was granular with an average particle size of 53 microns and a bulk density of 1.51 grams/mL.

Example 2

Silver nitrate (3.02 g, 17.76 mmol) was dissolved in 40 mL of deionized water and placed in a 250 mL round bottom flask with a small magnetic stir bar. Ammonium hydroxide solution (28%, 10 mL, ~80 mmol) was added. A solution of sodium azide (1.2 eq., 1.40 g) in 20 mL of deionized water was added followed by glycerol monoacetate (12.7 eq., 25 mL). The mixture was placed in a preheated oil bath (80° C.), fitted with an (ambient temperature) condenser and stirred at 80° C. for 16 minutes as a clear monophasic solution (the glycerol monoacetate is miscible with water). At 16 minutes, silver azide began to crystallize. The reaction was continued at 80° C. for a total reaction time of 1 hour 5 minutes. The suspension was removed from the bath, cooled to room temperature and filtered over Whatman #1 filter paper. The silver azide product was washed with water and 2-propanol and allowed to air dry. Overall field was 92% based or silver.

Example 3

Silver nitrate (331.1 g, 1.95 mol) was dissolved in 6000 mL of deionized water and placed in a 20 L jacketed glass reactor. Ammonium hydroxide solution (28%, 1320 mL, 19.90 mol) was added followed by ethylene glycol diacetate (3,542 mL, 27.34 mol). A solution of sodium azide (153.4 g, 2.36 mol) in 600 mL of deionized water was added. The clear, biphasic mixture was heated (60° C. set point) in the reactor with mechanical stirring at 300 RPM. After 47 minutes, the temperature had reached 65° C. and the set point was reduced to 55° C. Silver azide started to crystallize at 1 hour and 22 minutes and the temperature had stabilized at 56° C. The reaction was continued at 56° C., for a total reaction time of 4 hours 40 minutes. The suspension was allowed to settle and the liquid was decanted via vacuum. The silver azide solids were washed 3× with 200 mL DI water, 3× with 5000 mL DI water (with stirring and settling/decant between washes) and then 2× with 5000 mL, of 2-propanol. The solids were dumped from the reactor, residual liquid was removed by remote filtration and the solids were allowed to air dry. Overall yield was 300 grams (>95%) based on silver. The product had an average particle size of 200 micron, was cubic in habit and somewhat agglomerated (see FIG. 1) and had a bulk density of 1.2 gram/mL.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A method of preparing silver azide comprising reacting a solution of a silver salt, an azide salt, ammonium hydroxide, and a hydrolysable ester at a temperature in a range of 50° C. to 80° C., wherein the hydrolysable ester reacts with ammonia released by the ammonium hydroxide.

2. The method of claim 1, wherein the silver salt comprises at least one of silver nitrate and silver acetate.

3. The method of claim 1, wherein the azide salt comprises at least one of sodium azide and potassium azide.

4. The method of claim 1, wherein the hydrolysable ester comprises at least one of ethylene glycol diacetate and glycerol monoacetate.

5. The method of claim 1, further comprising supplying the azide salt in a molar ratio range of about 1 mole to about 1.2 moles per mole of silver salt.

6. The method of claim 1, further comprising supplying the ammonium hydroxide in a molar ratio range of about 3 moles to about 6 moles per mole of silver salt.

7. The method of claim 1, further comprising supplying the hydrolysable ester in a molar ratio range of about 10 moles to about 15 moles per mole of silver salt.

8. The method of claim 1, wherein the temperature is greater than 50° C.

9. The method of claim 1, wherein the temperature is no greater than 75° C.

10. The method of claim 1, wherein the temperature is about 55° C. to about 65° C.

11. The method of claim 1, further comprising producing a yield of at least 95% silver azide.

12. The method of claim 1, further comprising adding a solvent to form the solution of the silver salt, the ammonium hydroxide, and the azide salt.

13. The method of claim 12, wherein the solvent comprises water.

14. The method of claim 1, wherein the silver azide homogeneously crystallizes throughout the solution.

15. The method of claim 1, wherein the silver azide is thermally stable at temperatures exceeding 500° F. for up to 24 hours.

16. The method of claim 1, wherein the silver azide crystals have a consistent cubic morphology.

17. A method of preparing silver azide comprising:
mixing a silver salt and ammonium hydroxide in water;
adding an aqueous solution of an azide salt;
adding a hydrolysable ester, wherein the hydrolysable ester is added in an amount sufficient to neutralize substantially all ammonia released by the ammonium hydroxide; and
heating the mixture.

18. The method of claim 17, wherein the silver salt comprises at least one of silver nitrate and silver acetate.

19. The method of claim 17, wherein the azide salt comprises at least one of sodium azide and potassium azide.

20. The method of claim 17, wherein the hydrolysable ester comprises at least one of ethylene glycol diacetate and glycerol monoacetate.

21. The method of claim 17, further comprising adding the azide salt in a molar ratio range of about 1 mole to about 1.2 moles per mole of silver salt.

22. The method of claim 17, wherein the silver salt and the ammonium hydroxide are mixed in a molar ratio range of about 3 moles to about 6 moles per mole of silver salt.

23. The method of claim 17, the hydrolysable ester is added in a molar ratio range of about 10 moles to about 15 moles per mole of silver salt.

24. The method of claim 17, wherein the mixture is heated to a temperature greater than 50° C.

25. The method of claim 17, wherein the mixture is heated to a temperature no greater than 75° C.

26. The method of claim 17, wherein the mixture is heated to a temperature of about 65° C.

27. The method of claim 17, further comprising producing a yield of at least 95% silver azide.

28. The method of claim 17, wherein the silver azide homogeneously crystallizes throughout the solution.

29. The method of claim 17, wherein the silver azide is thermally stable at temperatures exceeding 500° F. for up to 24 hours.

30. The method of claim 17, wherein the silver azide crystals have a consistent cubic morphology.

31. A method of preparing silver azide comprising:
adding an aqueous solution of an azide salt (solution B) to an aqueous solution of a silver salt and ammonium hydroxide (Solution A);
adding a suitable ester that reacts with ammonia released by the ammonium hydroxide; and
heating the solution to a temperature in a range of 50° C. to 80° C.

32. A method of preparing silver azide comprising:
adding an aqueous solution of sodium azide (solution B) to an aqueous solution of silver nitrate and ammonium hydroxide (Solution A);
adding ethylene glycol diacetate; and
heating the solution to a temperature of about 55° C. to about 75° C., wherein the ethylene glycol diacetate reacts with ammonia released by the ammonium hydroxide.

33. The method of claim 32, wherein the silver azide homogeneously crystallizes throughout the solution.

34. The method of claim 32, wherein the silver azide is thermally stable at temperatures exceeding 500° F. for up to 24 hours.

35. The method of claim 32, wherein the silver azide crystals have a consistent cubic morphology.

* * * * *